April 2, 1940.　　　F. B. JACOBSON　　　2,196,115
TRAILER HITCH
Filed Sept. 30, 1939
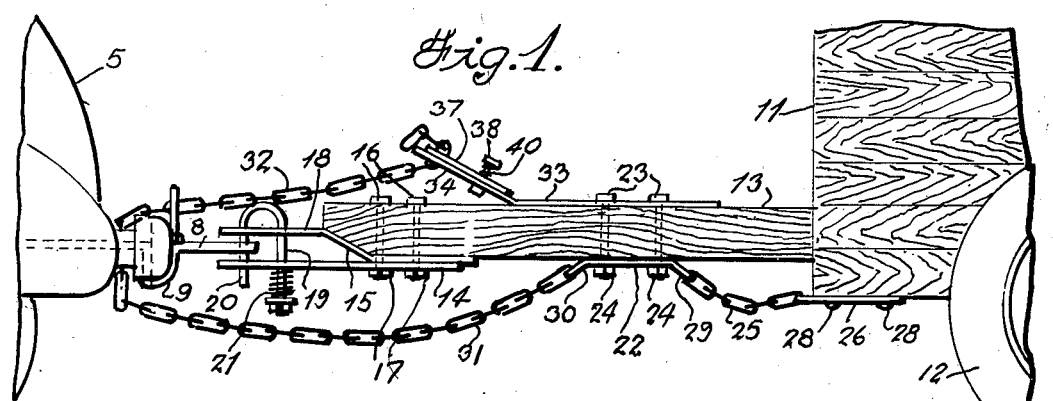
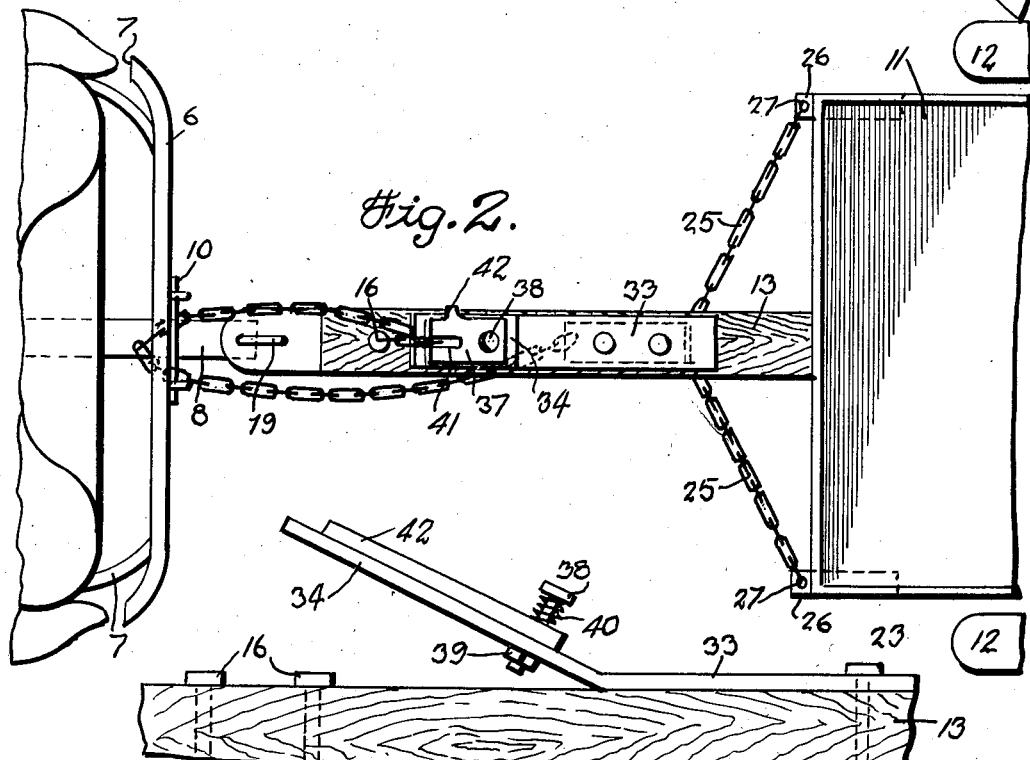
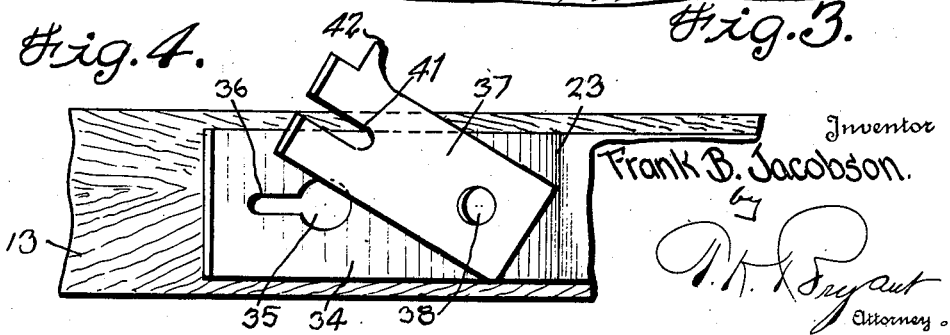
Inventor
Frank B. Jacobson.

Patented Apr. 2, 1940

2,196,115

UNITED STATES PATENT OFFICE 2,196,115

TRAILER HITCH

Frank B. Jacobson, Dakota City, Iowa

Application September 30, 1939, Serial No. 297,377

3 Claims. (Cl. 280—33.44)

This invention relates to improvements in trailer hitches.

The primary object of this invention is to provide a trailer hitch with an auxiliary coupling to prevent breaking away of the trailer from the vehicle in the event that breakage occurs adjacent the usual coupling or draft bar.

A further object of this invention is to provide an auxiliary flexible coupling member which will not hinder the operation of the usual coupling but will provide a safe connection should any part of the hitch or tongue give way.

In most States, laws governing highways require a safety chain associated with the trailer coupling which must be strong enough to hold the load upon failure of operation of the coupling or in the event that any part thereof should become broken. It is also an object of this invention to provide a safety chain which is simple in operation and which may be economically constructed.

Other objects and advantages of the invention will become apparent during the course of the following description of the accompanying drawing, wherein, Figure 1 is a side elevational view illustrating the application of the safety chain to a conventional trailer hitch;

Figure 2 is a top elevational view also illustrating the safety chain and showing the manner in which the same is looped around the bumper bar of the draft vehicle and the manner in which the free end is detachably held in place;

Figure 3 is an enlarged fragmentary side elevational view of the chain locking member; and Figure 4 is an enlarged fragmentary top elevational view of the chain locking device.

In the drawing, wherein for the purpose of illustration, there is shown a preferred embodiment of the invention wherein like reference characters will be employed to designate like parts throughout the same and wherein the reference character 5 will be employed to generally designate a motor vehicle having a bumper bar 6 supported from the vehicle chassis by side bars 7. A draw bar 8 is connected to the chassis and extends under the bumper bar 6 as at 9 and is clamped thereto by means of a clamping bar 10.

The trailer 11 is supported by wheels 12 and is provided with a tow pole 13, the free end of which is provided with coupling bars 14 and 15 securely held in place by a pair of bolts 16 on the end of which is threaded nuts 17. The forwardly projecting end of the parallel bar 15 is angularly bent and spaced from the bar 14 as at 18 so that the draft bar 8 may extend therebetween and be held in place by a U-shaped locking pin 19, one end of which as at 20 extends downwardly through openings in the bars 14, 18 and 8, while the opposite end is provided with a coil spring 21 to retain the U-shaped locking pin 19 in its locked position.

The invention comprises a plate 22 secured to the draw bar 13 by means of bolts 23 which are anchored in place by nuts 24 and secured to the plate 22 is a pair of outwardly extending chain sections 25, the free ends of which are connected to plates 26 as at 27. The plates 26 are anchored to the side edges of the trailer 11 by bolts or the like 28 and the opposite ends of the chain 25 connect with angular portions 29 formed on the plate 22.

An angular portion 30 is formed on the opposite end of the plate 22 and is provided with an opening for receiving a chain 31 adapted to extend forwardly as shown in Figure 1 so that the free end as at 32 may pass under and over the bumper bar 6 for connection with a locking plate carried by the upper surface of the draw bar 13.

The locking plate comprises a bar 33 anchored to the draw bar 13 by means of the bolt 23 extending therethrough and it will be noted that the forward end of the locking bar projects upwardly as at 34 in spaced relation from the surface of the draft bar 13. Formed in the upwardly projecting portion 34 there is formed a key hole slot including a circular portion 35 having a reduced slotted portion 36 communicating therewith as clearly shown in Figure 4. After the chain 31 has its free end 32 passed under and over the bumper bar 6, it is fastened in the key hole slot by inserting the same through the circular portion 35 and allowing the link to slip forwardly into locking engagement with the slot 36.

A latch plate 37 is pivotally attached to the upwardly and forwardly projecting portion 34 and is held in place by a bolt 38 extending through openings therein having threaded on the opposite end a nut 39 to prevent the displacement of the bolt 38. A coil spring 40 is interposed between the bolt head 38 and the swinging plate 37 to resiliently hold the plate 37 into face contact with the upwardly and forwardly extending portions 34 of the plate 33.

The free swinging end of the latch plate 37 is provided with an inwardly extending slot 41 adapted to register with the key hole slots 35 and 36 to engage the chain 32 as shown in Figure 2. A finger piece 42 extends laterally from the latch plate 37 for assisting in manipulating the plate during latching and unlatching of the chain end 32 in place.

It is to be understood, that the form of the invention as shown and described is to be taken as the preferred embodiment of the same and that various changes in the shape, size and arrangement of parts may be resorted to without departing from the spirit and scope of the invention as claimed.

I claim:

1. In combination with a motor vehicle having a rear bumper guard, a trailer hitch associated therewith, a safety chain connecting the trailer hitch extending forwardly and under the bumper bar, a locking plate carried by the trailer hitch having a key hole slot therein for receiving the free end of the safety chain and means for locking the free end of the safety chain in the key hole slot.

2. In combination with a motor vehicle having a rear bumper guard, a trailer hitch and draft bar connecting the bumper guard and a safety chain connected to the underside of the draft bar extending forwardly under and over the bumper guard and a locking plate carried by the draft bar having a key hole slot for receiving the free end of the safety chain.

3. In combination with a motor vehicle having a rear bumper guard, a trailer hitch and a draft bar associated with the bumper guard, a safety chain connected to the underside of the draft bar and extending forwardly and under the bumper bar, the free end of the safety chain extending rearwardly to the upper side of the draft bar, a locking plate carried by the draft bar having a key hole slot for receiving the free end of the safety chain and a latch plate pivotally secured to the locking plate adapted to prevent displacement of the free end of the safety chain from disengagement with the key hole slot therein.

FRANK B. JACOBSON.